United States Patent [19]

Crater

[11] Patent Number: 4,782,219
[45] Date of Patent: Nov. 1, 1988

[54] SYSTEM AND METHOD FOR READING SPECULAR BARCODES

[75] Inventor: David J. Crater, Topanga, Calif.

[73] Assignee: Laser Identification Systems, Inc., Camarillo, Calif.

[21] Appl. No.: 881,085

[22] Filed: Jul. 2, 1986

[51] Int. Cl.$^4$ .............................................. G06K 7/10
[52] U.S. Cl. .................................. 235/462; 235/454; 250/566
[58] Field of Search ............... 235/454, 457, 462, 467; 250/569, 566, 568; 356/300

[56] References Cited

U.S. PATENT DOCUMENTS

| | | | |
|---|---|---|---|
| 3,479,519 | 11/1969 | Keidel | 250/566 |
| 3,663,801 | 5/1972 | Wahli et al. | 250/566 |
| 3,808,447 | 4/1974 | Leavens, Jr. | 250/569 |
| 3,812,374 | 5/1974 | Tuhro | 250/568 |
| 3,978,317 | 8/1976 | Yamaguchi et al. | 235/462 |
| 4,013,893 | 3/1977 | Hertig | 250/568 |
| 4,025,761 | 5/1977 | Hayosh et al. | 250/566 |
| 4,057,784 | 11/1977 | Tafoya | 235/467 |
| 4,160,902 | 7/1979 | van Wijngaarden | 235/462 X |
| 4,333,006 | 6/1982 | Gorin | 235/457 |
| 4,335,301 | 6/1982 | Palmer et al. | 250/555 |

Primary Examiner—Philip H. Leung
Attorney, Agent, or Firm—Koppel & Jacobs

[57] ABSTRACT

A system and method is disclosed for increasing the usable detector angle of a laser beam containing encoded barcode information. Diffusing material capable of dispersing a beam, is placed between an illuminating source and a detector. The diffuser can be reflective or transmissive in nature, and is incorporated within the system to improve the readability of information encoded on a laser beam and reflected by specular material. In one embodiment the illuminating source directs a laser beam towards a specular barcoded material encoded with information. The laser beam is reflected by the specular material with generally little change in the beam angle, to the diffuser. The diffuser disperses the beam angle before directing it to the detector which is capable of reading and analyzing the information encoded on the beam. The increased angle improves the readability of the information contained in the laser beam and allows the use of a small source/large detector reader on specular barcoded material.

11 Claims, 5 Drawing Sheets

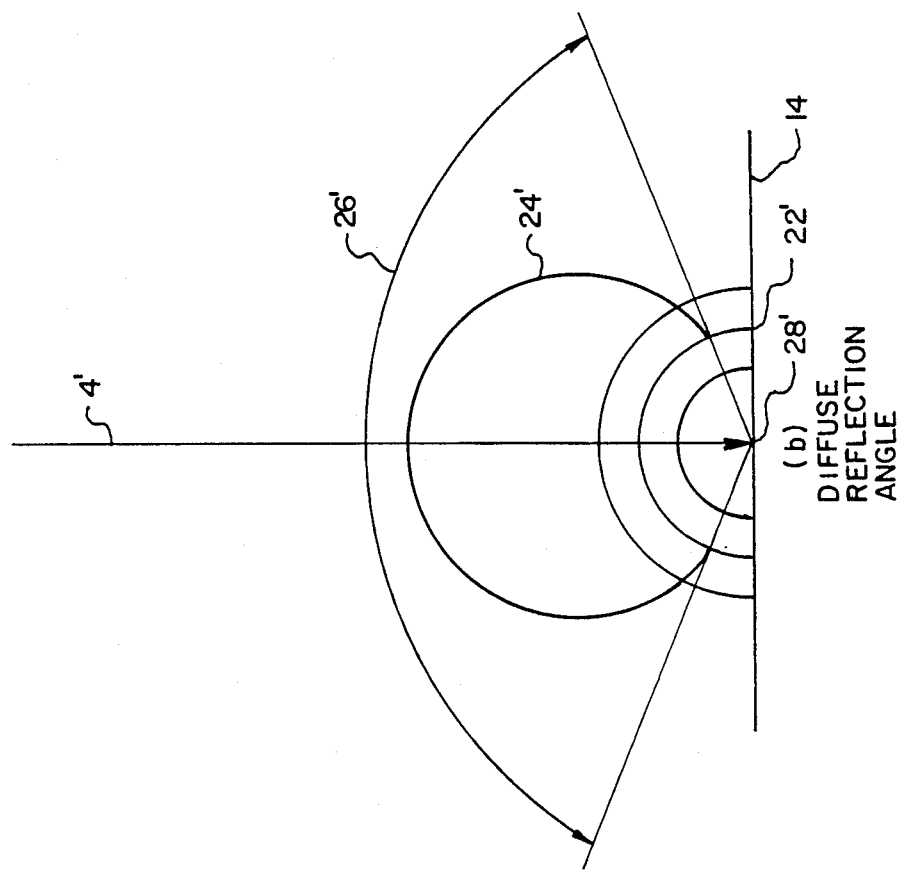
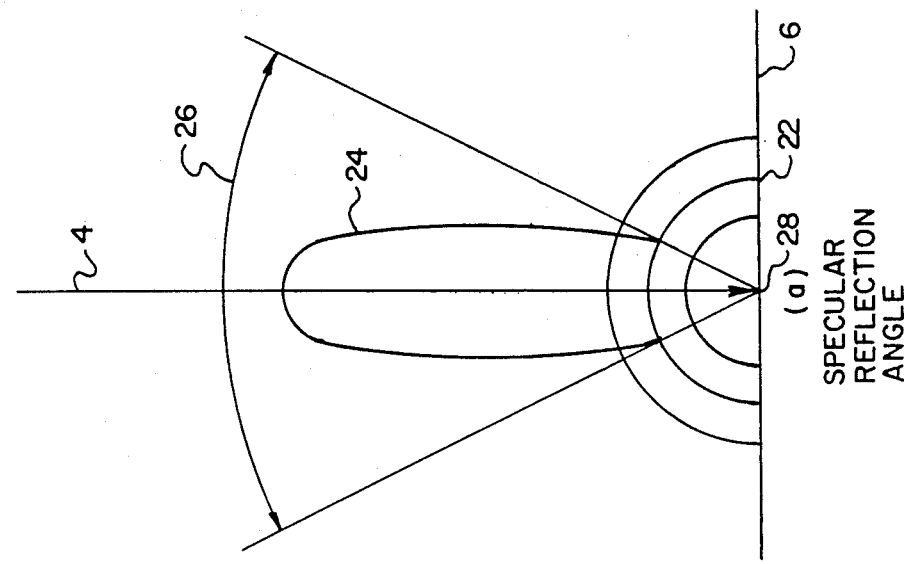
FIG.3.

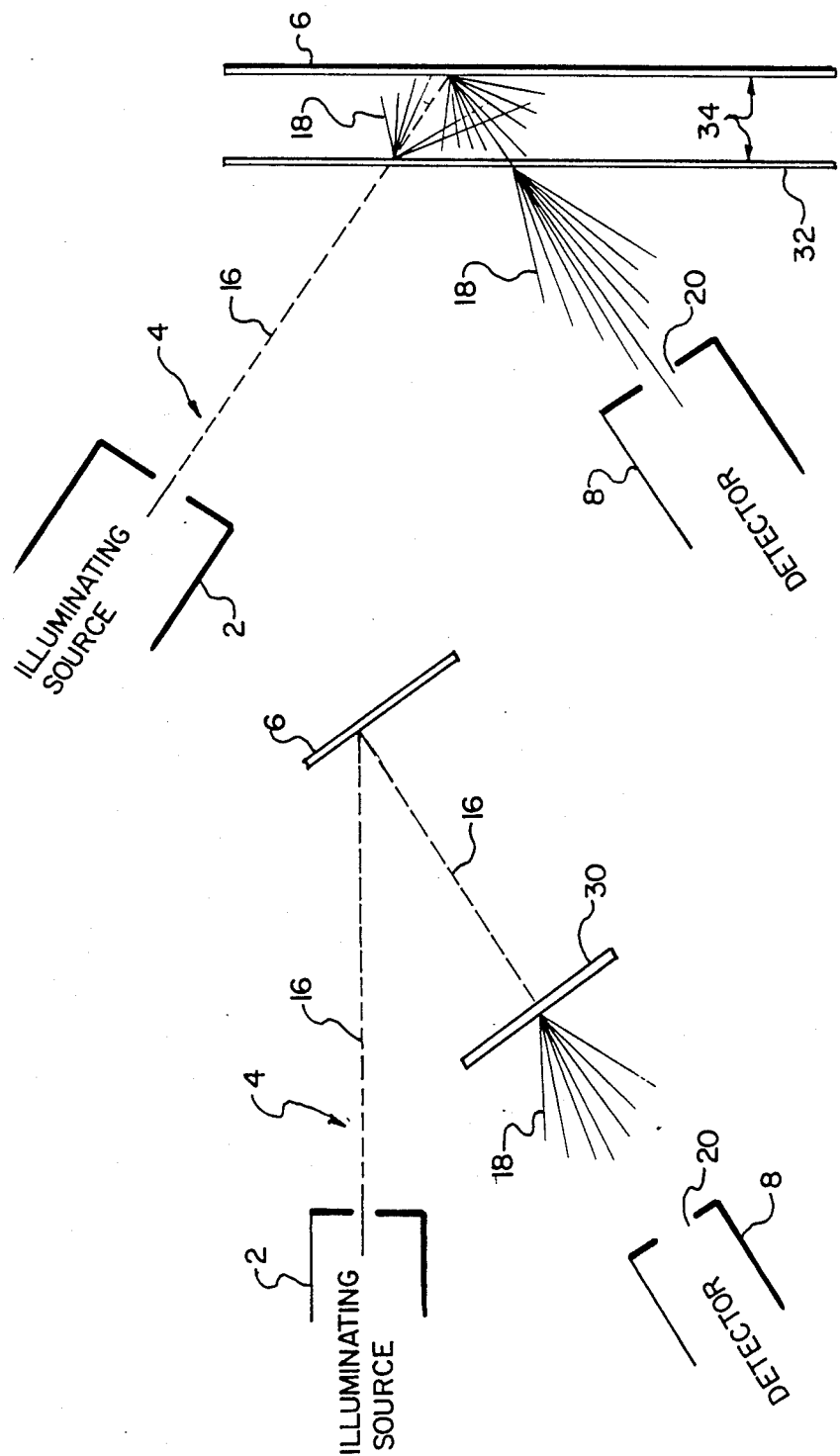

SYSTEM AND METHOD FOR READING SPECULAR BARCODES

BACKGROUND OF THE INVENTION

1. Field of the Invention

This system and method relate to an optical reading of luminescent barcodes on merchandise and similar items. More specifically, the system and method relates to the improved readability of barcodes on specularly reflecting materials.

2. Description of the Prior Art

Several industries track and maintain information by reading data encoded symbols, such as a barcode. In present day merchandising operations, data pertaining to the purchase of a merchandised item is obtained by reading a barcode printed on the merchandised item. Barcoded information may also be used by an organization internally to track inventory and to maintain documentation. Hospitals, for example, may use barcoded information to track patients and their records. In order to standardize the barcodes used at various points of the read-out system, several industries have adopted various standardized codes. Retail food suppliers have adopted the Uniform Product Code (UPC) in the form of a barcode, while other industries use standardized codes which most accurately meet their needs. Various systems have been constructed to read this barcode, including hand-held wands which are moved across the barcode, and stationery optical reading systems, typically located within the check-out counter of a grocery store. The barcode is read when a purchased merchandised item is passed across a window constituting the scanning area of the counter.

Typically, barcodes are read by illuminating the coded surface and detecting the variations in contrasts of the bars and spaces. The ratio of the width of white bar elements and black bar elements, along with the order in which the bar elements are placed specifies the encoded information. In order to achieve an adequate reading a number of conditions must be met. First, the illumination source must reflect enough light from the coded surface and through the aperture of the decoder to give the decoder the needed signal strength to produce a usable output. Second, the contrast between the bars and spaces of the barcode, as perceived by the detector, must be sufficient to produce signal levels and signal-to-noise ratios large enough to convey the desired information. And third, either the detector or the illumination source must be able to convert the light and dark areas corresponding to the bars and spaces into a serial information stream of sufficient regularity and consistency to allow the decoder to properly interpret the contrast information.

Barcode readers are typically categorized according to the relative aperture size of their illumination source and detector. An aperture is an opening that emits light from a source or admits light into a detector, and is measured according to the diameter of either the opening or the light beam. Scanning helium-neon laser barcode readers use a laser illumination source of small aperture in conjunction with a relatively large area detector. The detector aperture is generally between 100 to 1000 times the area of the light source aperture. Hand-held wands also use a laser illumination source of a small aperture with a large area detector. In the general case of a small source/large detector reader, the reader is dependent upon the reflective characteristics of the coded material to ensure that sufficient radiation is reflected from the barcoded material onto the detector aperture to provide usable signal levels. The reflective characteristics of barcoded material may be specular or diffuse in nature. In theory, specular material reflects a light beam directed perpendicular to the material with no change in the cross-sectional area of the beam. In reality, specular material reflects this beam with generally little change in the beam's cross-sectional area. Diffuse material causes the reflected beam to disperse, increasing the angle of the beam directed to the detector. In the case of highly specular materials, the reflection of the generally collimated illumination source is contained within a narrow angle. Therefore, the angle of the coded surface relative to the incident radiation and the location of the detector must be tightly controlled to ensure that the aperture falls within the reflected light. It is this angular requirement which renders small source/large detector readers marginally usable on specular materials.

A number of systems have been developed to improve the readability of barcoded material, with varying degrees of success. U.S. Pat. No. 3,812,374 to Tuhro (1974) discloses a system for reading a diffuse reflective label. The device suppresses specular reflection commonly used in a system for reading a diffuse reflective barcoded label. The apparatus includes a polarized radiation source having a first polarization and means for providing relative motion between the label and the polarized radiation for scanning a diffuse relative label with the polarized radiation. Polarizing means are provided for selectively blocking specular reflections having the first polarization and passing radiation having other polarization by increasing the signal-to-noise ratio of the diffusively reflected radiation to the specularly reflected radiation.

U.S. Pat. No. 4,013,893 to Hertig (1977) discloses an optical barcode scanning device for high data density barcode readings. The device utilizes a two channel arrangement for directing light reflected from the barcode being read onto two photodetectors in predetermined proportionate amounts. The two channel system detects a barcode edge independent of print contrast variations, resolution modulation or change of illumination, by comparing the optical signal of one channel with the optical signal of the other. In U.S. Pat. No. 4,160,902 to Van Wijngaarden (1979) an optical reading head for reading luminescent barcodes is disclosed. The reading head is provided with a source of light for irradiating the bars of the barcode and a detector which includes a hollow optical guide means for collecting the rays emitted by the bars. To correctly convert the barcodes into electronic signals, it is essential that the bars be very sharply and distinctly observed by the light-sensitive detector.

A holographic system for scanning barcode indicia is disclosed in U.S. Pat. No. 4,333,006 to Gorin, et al. (1982). A laser is directed at a first set of holograms located on a single rotating disc, each hologram generating an individual scan beam having a slightly different focal length and direction angle than that of the other holograms. The generated scanning beams are directed onto a target area and a label, or an object bearing a barcode indicia is passed over this target area. The light reflected from the barcode indicia is picked up by a second set of holograms mounted onto the rotating disk and focused onto an optical detector used to read the barcode.

Several difficulties are encountered in using conventional barcode readers with specularly reflecting materials. The angle needed to correctly read the barcode is unacceptably tight when the barcoded item is held within the range commonly used in barcode systems. Certain combinations of material, illumination source and reading conditions may combine to make convenient barcode reading impossible.

SUMMARY OF THE INVENTION

In view of the above problems associated with the prior art, the object of the present invention is the provision of a novel and improved system and method for reading barcodes on specularly reflecting materials.

Another object is the provision of such a system and method in which a secondary diffuser of reflective or transmissive nature is used to improve the readability of barcodes on specularly reflecting materials.

A further object of the present invention is the provision of a system and method in which the specular reflection from the barcoded specimen is converted to a diffuse reflection, or an apparent diffuse reflection, allowing the required specimen angle to be relaxed.

In the achievement of these and other objects of the invention, a diffuse reflector is provided which receives a beam of light reflected from the specular barcoded material and diffuses the beam, increasing the angle to resemble the angle of a light source reflected from a diffuse barcoded material.

An illuminating source directs a laser beam onto a specular barcoded material. The beam is reflected from the specular material, with generally little change in the angle of the beam, onto a diffuse reflector or transmitter. The diffusing material causes the laser beam to disperse, increasing the cross-sectional area of the beam. The laser beam is reflected from the diffusing material onto a detector with a fixed diameter aperture. The diffused beam allows a larger cross-sectional area over which the detector could be placed and still be capable of receiving a signal from the beam, providing the same results as if the illuminating source had directed a laser beam onto a diffuse barcoded material.

Specular and diffuse properties cover a wide spectrum of materials. Very reflective material, such as polished gold and polished silver are located on the specular end of the spectrum. Opaque materials, such as barium sulfate, white ceramic and white bond paper are found on the diffuse end of the spectrum. In theory, the optimum diffusing material is a Lambertian reflector. A barium-sulfate surface most closely follows the Lambertian law of physics and has been accepted as the industry standard for a Lambertian reflector.

In a preferred embodiment, the diffusing material used may be reflective or transmissive in nature. With a diffuse reflector, a laser beam is directed onto specular barcoded material which reflects the beam with generally no change in the beam angle, onto the reflector. The diffuse reflector receives a low divergence beam and reflects a beam with a greater angular divergence, providing a larger area over which the detector could be placed. This allows the detector to receive a signal from which the encoded information can be read.

A transmissive differ may be used as either a single pass diffuser or as a double pass diffuser. The single pass transmissive diffuser is positioned between the specular barcoded material and the detector. The laser beam is reflected by the specular material, with generally little increase in the beam angle, through the transmissive diffuser and towards the detector. As the beam passes through the diffuser the beam angle is dispersed, delivering a beam with an increased angle to the detector and improving the detector's ability to read the barcoded information.

A double pass transmissive diffuser is placed generally parallel to the specular barcoded material, with the laser beam directed towards the specular material at an angle. Before the beam reaches the specular material it passes through the transmissive diffuser and is dispersed. The dispersed beam is then reflected by the specular material back through the transmissive diffuser towards the detector, further dispersing the beam angle. An alternate form of a transmissive diffuser is a thin coating of diffuse material applied to the surface of the specular material. A laser beam directed towards the specular material must pass through the diffusing surface. As the beam passes through the surface the angle of the beam is dispersed before being reflected by the specular material back through the diffusing surface, additionally dispersing the beam angle before it is received by the detector.

Further objects and features of the invention will be apparent to those skilled in the art from the following detailed description of the preferred embodiments, taken together with the accompanying drawings, in which:

DESCRIPTION OF THE DRAWINGS

FIG. 3 illustrates the angle properties of a specular and diffused beam;

FIG. 4 is a side elevation view of a second embodiment of the present invention;

FIG. 5 is a side elevation view of a laser beam being emitted and transmitted by a double pass transmissive diffuser;

DETAILED DESCRIPTION OF THE PREFERRED EMBODIMENT

Figure 2:
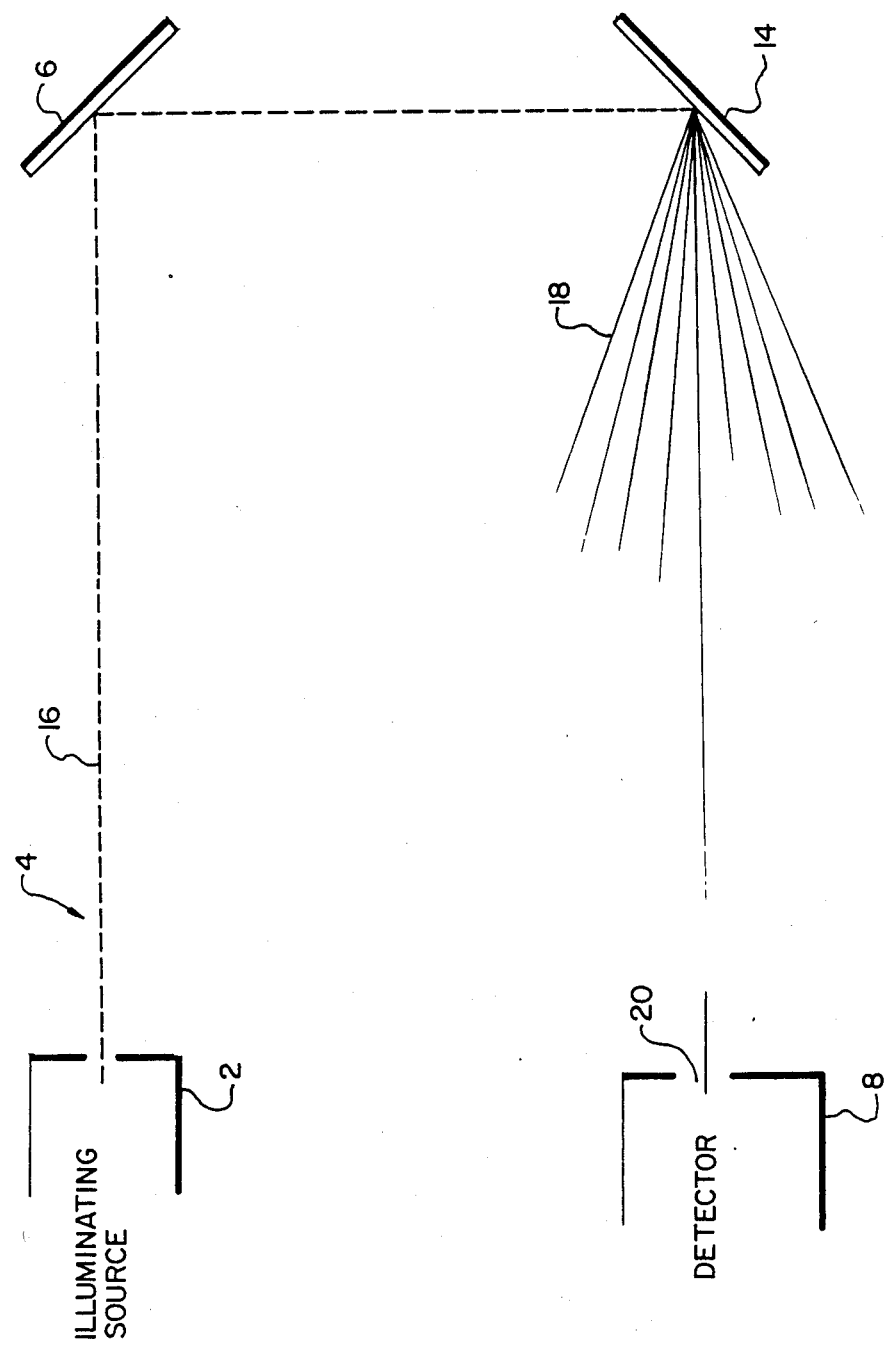
FIG. 2 is an elevation view of one embodiment of the present invention showing the progress of a laser beam through the system.

The principle components of the system and method for reading specular barcodes, shown in FIG. 2, are an illuminating source 2 which emits a laser beam 4, a specular barcoded material 6 onto which the laser beam is directed, a diffusing means 14 which receives the laser beam reflected from the specular barcoded material, and a detector means 8 which reads and analyzes the information encoded on the laser beam.

Figure 1:
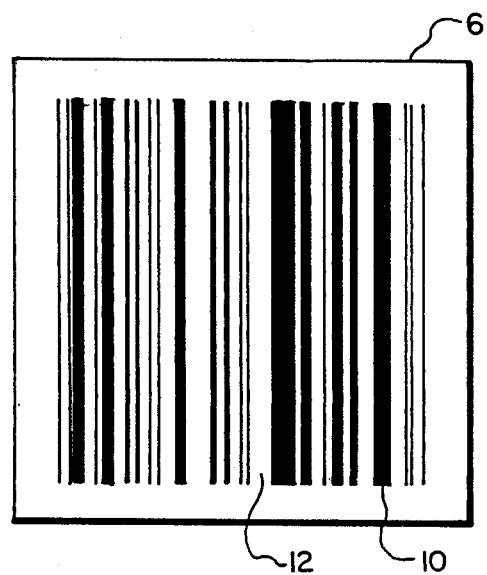
FIG. 1 is an elevation view of specular barcoded material.

The illuminating source is preferably a one milliwatt helium-neon laser which emits a beam directed towards the specular barcoded material. The specular material 6, illustrated in FIG. 1, is comprised of a plurality of black barcode elements 10 and white barcode elements 12 encoded with data. The illuminating source is housed within a scanning device which scans the beam across the barcodes. The data encoded on the barcode elements is defined by the ratio of the width of the black barcode elements 10 to the white barcode elements 12, and by the order in which the barcode elements are arranged. The height of the barcode elements is not a factor in determining the information encoded. The barcode elements are extended beyond the minimal height needed to allow the laser beam 4 to scan the barcode at an angle and still receive an accurate reading of each element. Each element of the barcode is the same height with a minimum element width of 0.0075 inch. The determination of a narrow or wide ratio of black elements to white elements is defined by each code principle (i.e. UPC).

The first embodiment of this invention is illustrated in FIG. 2. In this embodiment the diffusing means is a diffuse reflector 14. The illuminating source 2 directs a generally collimated laser beam 4 towards a barcode element etched into specular barcoded material 6. The beam is scanned across the barcode and is encoded by the pattern of black and white barcode elements 10 and 12. The specular barcoded material reflects the laser beam onto the diffuse reflector 14 with generally little change in the beam angle. The diffuse reflector receives the collimated beam 16 and disperses it, substantially increasing the angle of the beam while retaining the initial information contained on the beam. The dispersed beam 18 is reflected from the diffuse reflector towards a detector 8 which includes an entrance aperture 20 with a fixed diameter.

When the laser beam is dispersed the readability of the information encoded on the beam is improved. As illustrated in FIG. 3, a dispersed beam contains an minimum usable flux 22 and an polar plot of reflected radiant flux 24, but more importantly, dispersion increases the usable detector angle 26.

When a beam is directed onto specular material at a 90° angle, in theory a collimated beam should be reflected back along the path of the original beam. In reality, a beam reflected by specular material is reflected back with a generally small change in the beam angle (FIG. 3a). When a similar beam is reflected by diffuse material, the beam is dispersed (FIG. 3b) with the amplitude of the reflected beam being a factor of the reflection. Plotting the amplitude verse reflection produces the polar plot of reflected radiant flux 24 and delineates the actual signal received by the detector from the reflected beam. A plot of the signal needed to achieve a reading is produced by connecting the points equidistant from where the beam and material meet 28. The minimum usable flux 22 is the point of comparison and is found where these two plots meet. The usable detector angle 26 is created by passing a line through each point of minimum usable flux and point 28. The usable detector angle delineates the angle over which an acceptable reading with a barcode reader can be achieved.

A beam reflected by specular material 6 has a small cross-sectional area over which the aperture 20 of the detector could be placed in order to receive a signal from the beam, requiring tight control over the detector location to insure the readability of the data encoded on the beam. The increased usable detector angle of the dispersed beam 18 improves the readability of the beam, allowing for use of a small source/large detector reader on specular barcoded material.

The second embodiment of the invention, as shown in FIG. 4, uses a transmissive diffuser means which may be either a single-pass diffuser or a double-pass diffuser. When using a single pass transmissive diffuser 30, a laser beam 4 is emitted by an illuminating source 2 towards a specular barcoded material 6. The specular material reflects the beam towards a detector 8, with generally little change in the diameter of the beam. Before reaching the detector, the beam passes through the single-pass transmissive diffuser 30 which disperses the laser beam and increases the usable detector angle 26 of the beam. The increase in the usable detector angle improves the readability of the data encoded on the beam by supplying a larger cross-sectional area over which the detector aperture 20 could be placed.

A double-pass transmissive diffuser 32 may be used, if an additional increase in the usable detector angle 26 is required (FIG. 5). A double-pass transmissive diffuser 32 is placed generally parallel to a specular barcoded material 6 encoded with data. A laser beam 4 is emitted by an illuminating source 2 andd directed toward the specular material. Before reaching the specular material the beam is dispersed while making an initial pass through the transmissive diffuser 32. The dispersed beam 18 is reflected by the specular material 6 towards the detector 8. Before arriving at the detector the beam again passes through the transmissive diffuser 32 and is further dispersed. It is beneficial to minimize the distance 34 between the specular material and the transmissive diffuser. A large distance 34 would reduce the resolution capacities of the system and necessitate the use of less dense barcodes.

Figure 6:
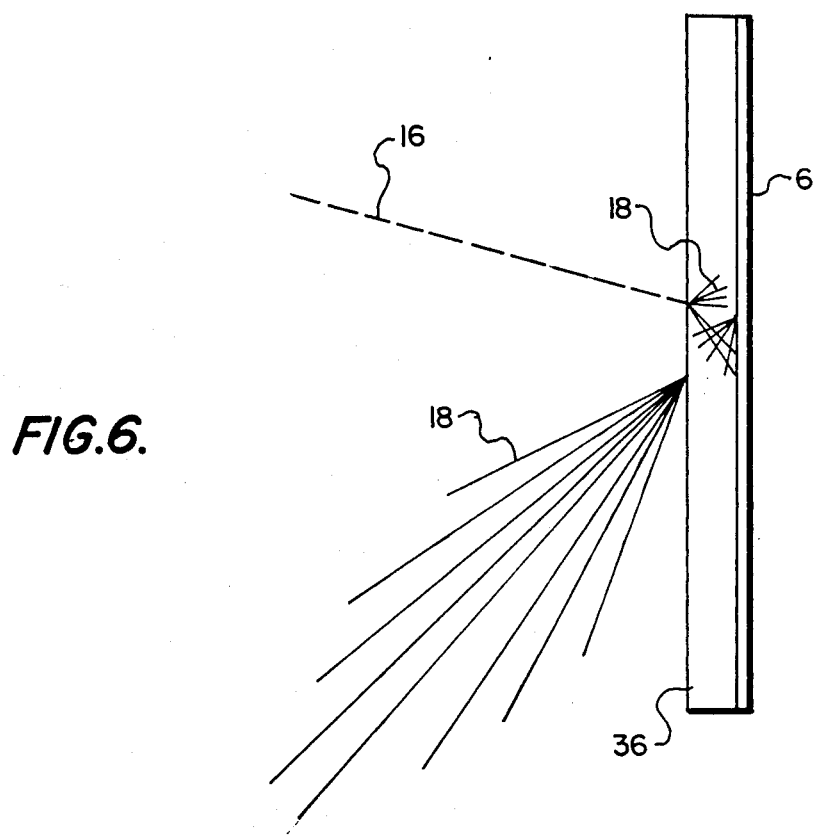
FIG. 6 is a side elevation view of a laser beam passing through a thin coating of diffusing material.

A transmissive diffuser may also be applied to the surface of a specular barcoded material as a thin coating 36 (FIG. 6). A laser beam 4 passes through the thin coating of diffusing material and is dispersed, before reaching the specular material 6. The dispersed beam 18 is reflected by the specular material towards a detector 8, being further dispersed as it passes through the diffusing material 36 a second time.

Figure 7:
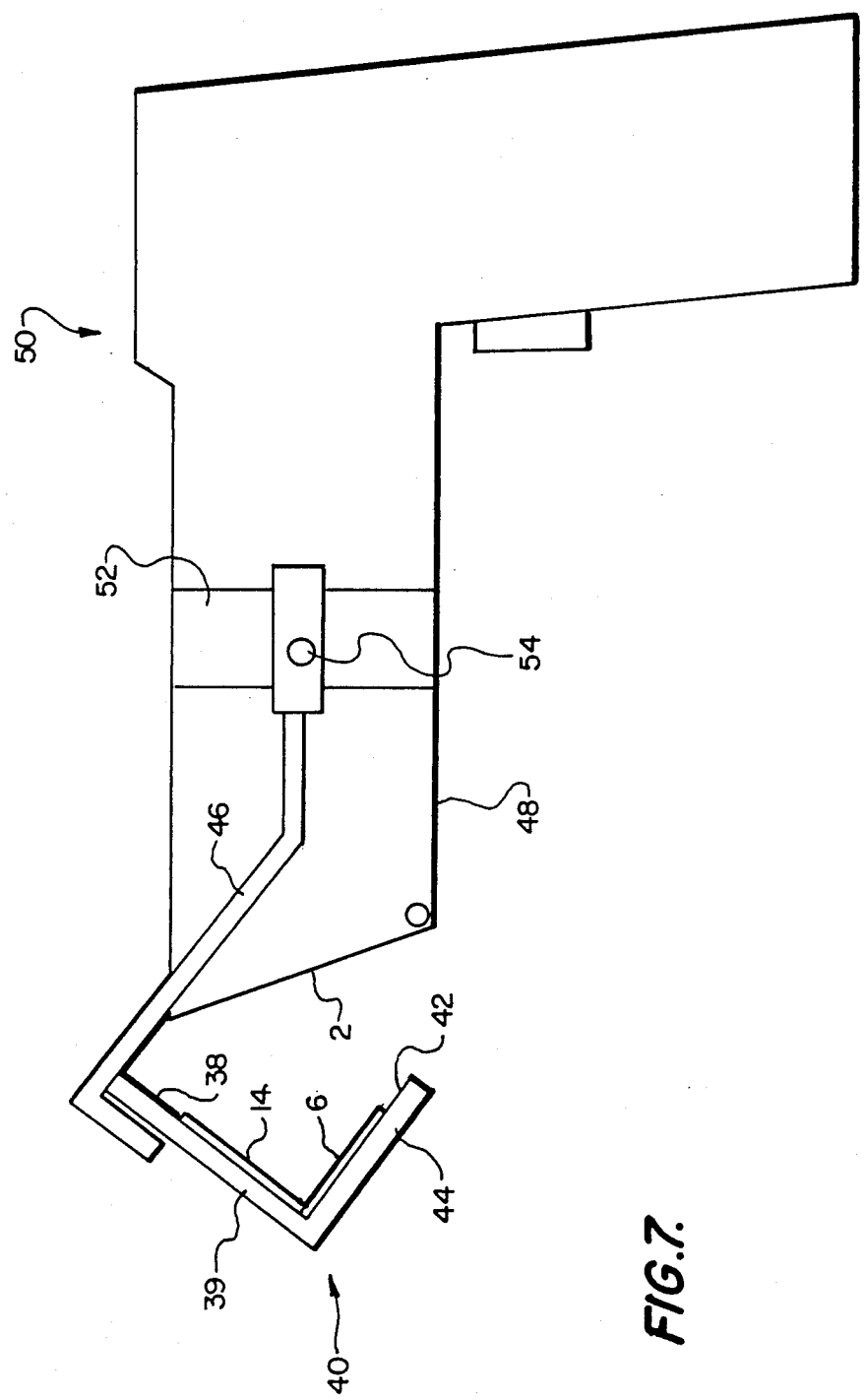
FIG. 7 is a side elevation of the present invention pivotly attached to a handheld wand.

One implementation of the invention, shown in FIG. 7, places a diffuse reflector 14 on the inside surface 38 of one leg 39 of an L-shaped member 40. The specular barcoded material 6 to be read is placed on the inside surface 42 of the opposite leg 44 of the L-shaped member, and is positioned up against the diffuse reflector 14. A laser beam 4 is directed onto the specular material and reflected onto the diffuse reflector. Information is read by the detector 8 from the diffuse reflector. The L-shaped member 40 is attached to a handle 46 that is pivotly connected to the nozzle 48 of a hand-held wand 50 by a clamp 52 and screw 54 assembly. The L-shaped member 40 is capable of swinging away from the nozzle 48 and out of the way when not in use.

All of the embodiments discussed above increase the usable detector angle 26 of the laser beam 4 by a substantial amount. The increased angle improves the readability of the information contained in the laser beam.

A system and method that provides a novel and improved procedure for reading specular barcodes has thus been shown and described. As numerous modifications and alternate embodiments will occur to those skilled in the art, it is intended that the invention be limited only in terms of the appended claims.

I claim:

1. A system for reading the information encoded on specular barcode material, comprising:
an illuminating source adapted to emit a light beam with a predetermined cross-sectional area towards the barcode material,
a detector positioned to receive a light beam reflected by the specular barcode material, said detector including an entrance aperture which has a substantially greater cross-sectional area than said predetermined light beam cross-sectional area, and a light diffusing means spaced from the detector and positioned in the beam path between the illuminating source and the detector, said diffusing means dispersing the light beam sufficiently for a readable portion of the beam to enter the detector aperture despite tolerances in the beam path.

2. The system as defined in claim 1, wherein the diffusing means is a diffuse reflector positioned to receive the light beam reflected from the specular material and to reflect the light beam onto the detector.

3. The system as defined in claim 1, wherein the diffusing means is a transmissive diffuser.

4. The system as defined in claim 1, including means for positioning a specular barcode material, wherein the diffusing means is a transmissive diffuser positioned to diffuse the light beam prior to its reaching the barcode material, and again after reflection from the barcode material.

5. The system as defined in claim 4, including a specular barcode material to be read, wherein the diffusing means is a transmissive diffuser contacting the specular material surface, the diffuser causing the light beam to disperse both as it approaches the specular material and after it has been reflected from the specular material.

6. The system as defined in claim 5, wherein the diffusing means is a thin coating of diffusing maerial applied to the surface of the specular material.

7. The system as defined in claim 4, wherein said diffuser is spaced from the barcode material position.

8. The system as defined in claim 1, wherein the illuminating source is a laser.

9. A method for reading the information encoded on specular barcode material, comprising:

reflecting a light beam with a predetermined cross-sectional area off the specular material, directing the light beam after reflection from said specular material onto a light detector which has a substantially greater cross-sectional area than said predetermined light beam cross-sectional area, detecting the light reflected from the specular material with said light detector, and diffusing the light beam sufficiently prior to said detector for a readable portion of the beam to be detected despite tolerances in the beam path.

10. The method as defined in claim 9, wherein the light beam is diffused after being reflected from the specular material.

11. The method as defined in claim 9, wherein the light beam is diffused both before and after reaching the specular material.

* * * * *